United States Patent [19]
Gelphman et al.

[11] Patent Number: 5,848,709
[45] Date of Patent: Dec. 15, 1998

[54] MULTIMEDIA STACKER RACK

[75] Inventors: Steven A. Gelphman, San Jose; Christopher G. Palmer; Peter J. Palmer, both of Saratoga, all of Calif.

[73] Assignee: Creative Point, Inc., Fremont, Calif.

[21] Appl. No.: 2,745

[22] Filed: Jan. 5, 1998

Related U.S. Application Data

[60] Provisional application No. 60/034,581 Jan. 9, 1997.

[51] Int. Cl.⁶ ........................................................ A47F 7/00
[52] U.S. Cl. .......................... 211/40; 211/41.12; 211/194; 211/43; 211/184; D6/407
[58] Field of Search ................................... 211/40, 41.12, 211/184, 194, 42, 43; D6/407; 206/308.1, 387.15

[56] References Cited

U.S. PATENT DOCUMENTS

| | | | |
|---|---|---|---|
| D. 397,883 | 9/1998 | Gelphman et al. | D6/407 |
| 4,867,318 | 9/1989 | Robson | 211/184 X |
| 4,995,682 | 2/1991 | Gutner | 206/387.15 X |
| 5,415,297 | 5/1995 | Klein et al. | 211/40 |
| 5,762,208 | 6/1998 | Yeh | 211/40 |
| 5,765,697 | 6/1998 | Soong | 211/40 X |

*Primary Examiner*—Robert W. Gibson, Jr.
*Attorney, Agent, or Firm*—Larry B. Guernsey; Michael J. Hughes

[57] ABSTRACT

A storage container (10) for storing, transporting and displaying various information and entertainment storage media, the container (10) including a floor panel (12) having a front edge (16) and a rear edge (17), and right and left edges (18, 19), a back wall (13) which attaches to the rear edge of the floor panel (17), left and right side panels (14, 15), which are attached to the left and right edges (18, 19) respectively of the floor panel (12), each side panel (14, 15) having a lower portion which terminates in a front foot (32) and the back wall (13) including a vertebra (50) which has a lower portion which terminates in a rear foot (52).

Also disclosed is a system of stackable storage containers (100) for storing, transporting and displaying various information and entertainment storage media, including a plurality of containers (10) having front and rear feet (32, 52), side panel contact shelves (20), vertebra contact shelves (54), and vertebrae (50), which are in alignment such that when an upper storage container (10) is stacked vertically upon a lower storage container (10), the front feet (32) of the upper storage container (10) rest upon the side panel contact shelves (20) and the rear foot (52) of the upper storage container (10) rests on the vertebra contact shelf (54) of the lower storage container (10), and the vertebrae (50) align to form a spine (110).

16 Claims, 7 Drawing Sheets

MULTIMEDIA STACKER RACK

CROSS-REFERENCE TO RELATED APPLICATIONS

This application claims the benefit of U.S. Provisional Application No.: 60/034,581 9 Jan. 1997.

TECHNICAL FIELD

The present invention relates generally to storage systems for providing access to generally planar objects and more particularly to systems for protecting, displaying and transporting media of various sorts, including disk media, audio and video tapes, video game cartridges and print media. The present invention is modular, and multiple instances of the individual units are designed to easily combine into large, stable assemblages for easy expansion of storage capacity.

BACKGROUND ART

The modem age has provided consumers with an opportunity, which is unprecedented in history, to accumulate large personal collections of mass media. There are many varieties of inexpensive media items on the market, such as books, videotapes, audiocassettes, compact disks, laser disks, etc., each type having generally different dimensions than the others. Storage of these personal collections has become a growing user concern as the various types have become more affordable, and more disposable personal income has been directed toward these forms of entertainment. It is not unusual for personal collections of such media to number in the hundreds or even thousands. To accommodate such large personal libraries, various storage devices have been used. The standard bookcase often wastes floor space when storing varieties of media. Cases for videotapes and compact disks which are designed to house media of specific dimensions may be stacked in a more space-saving manner, but these cases are generally not designed to be attached together in an overall system. They therefore lack stability and are not best used as freestanding structures. Additionally, they may lack aesthetic appeal.

Another user concern is that a storage system be adaptable to the demands of an individual's collection. An important consideration in housing these personal collections is that they are indeed individual. As each collector's library will be a reflection of his or her personal tastes, it is important that any storage and display system be flexible and adaptable to the needs of that collector. For example, it is important that the units of a storage system be available in a variety of heights to accommodate the dimensions of various media items as selected by the individual, while conserving space.

Since acquiring a collection is for most people an ongoing process whereby items are accumulated over the course of years, it is also important that the system be expandable to accommodate the newly acquired items of an individual's collection as it continues to grow. A storage system should have the ability to have additional modules added as required, while still maintaining stability and looking like it is part of a common scheme.

Over time, there may be certain media items in which the collector may lose active interest. It is convenient if these items may be grouped in a particular unit, which can be detached from the assemblage and then carried for placement in a for inactive storage. It is very useful if the detached unit has carrying handles to make transport convenient.

Another concern for merchandisers and manufacturers is the bulk involved in storage devices. Generally, unless disassembled, storage devices tend to be bulky because they are meant to enclose space to provide room for storing items. Requiring reassembly is undesirable and can cause problems of its own. Thus for both shipment and display for sale of storage units, it is desirable that units be able to nest or stack closely. This reduces shipping and warehousing space requirements, with attendant costs, and requires less floor and display space in retail stores. Purchasers also may find advantages in being able to nest units in a compact manner when they are not in use.

While some prior art systems have addressed some of these concerns, none have suitably addressed them all, and there remains a need for an improved multimedia storage system.

DISCLOSURE OF THE INVENTION

Throughout this disclosure, and in the best mode description, it is to be understood that the term "unit" shall be used to refer to a single detached rack, and the term "assemblage" shall be used to refer to multiple units which have been stacked together to form a larger structure.

Accordingly, it is an object of the present invention to provide storage for a variety of media types in a manner that provides easy viewing and access.

It is another object of the present invention to minimize required floor space for storage of media by being vertically stackable. is yet another object of the present invention to minimize storage space for media storage units which are not in use by designing them to nest upon each other.

It is still another object of the present invention to provide a system for storage of media that is easily adaptable to the user's needs by providing a variety of interchangeable storage units.

It is a further object of the present invention that the units be detachable from an assemblage and easily transportable while holding media.

It is an additional object of the present invention to provide a storage system that is aesthetically pleasing.

It is a yet further object of the present invention to provide a system for storage of media that is easily expandable to the user's needs by providing storage units which can be attached together.

It is another object of the present invention to provide a system which is free-standing and stable when storage units are stacked together to form larger assemblages.

Briefly, one preferred embodiment of the present invention is a storage unit for storing, transporting and displaying various information and entertainment storage media. This storage unit includes a floor panel which has a front edge and a rear edge, and right and left edges, and a back wall which attaches to the rear edge of the floor panel. The storage unit also has left and right side panels, which are attached to the left and right edges respectively of the floor panel, each of the side panels having a lower portion which terminates in a front foot. The back wall includes a vertebra, which has a lower portion which terminates in a rear foot. The storage unit has a handle portion on each side panel, and a divider which slides between the side panels to support stored items in an upright position. The floor panel and back wall are tilted backwards slightly to aid in retaining stored items in the storage unit. The front and rear edges of the floor panel are concentric arcs, with the front edge being of greater arc radius than the rear edge. This enables stored media, when stored vertically, to be fanned out slightly for easy inspection. The back wall is contoured to include an indent to accommodate the vertebra of a second storage unit which may be nested together with a first storage unit for easy storage or transport.

A second preferred embodiment of the present invention is a system of stackable storage units for storing, transporting and displaying various information and entertainment storage media. The system includes a number of storage units as described above. The storage units have front and rear feet, side panel contact shelves, vertebra contact shelves, and vertebrae, which are in alignment such that when an upper storage unit is stacked vertically upon a lower storage unit, the front feet of the upper storage unit rest upon the side panel contact shelves of the lower storage unit, the rear foot of the upper storage unit rests on the vertebra contact shelf of the lower storage unit, and the vertebrae align to form a spine.

Accordingly, an advantage of the present invention is that units of varying heights are available, all of which are interchangeable in stacking order. The shelves of the units are slightly curved to cause the media stored upon them to fan out slightly from the rear edge to the front for ease of viewing and removal.

Another advantage of the present invention is that the individual units are stackable to minimize floor space usage, and the units have interlocking sections which impart stability to the resulting assemblage. The units are also shaped with vertebrae to form a spine up the back of an assemblage of the units. This spine is designed with a large foot at its lower end to provide additional stability to the overall assemblage. This allows assemblages to be free-standing and independent of lateral support.

A further advantage of the present invention is that the individual units may have built-in carrying handles, which facilitate transportation and storage of the contained media. Sections of media that are not in current use can be sorted into designated units. These units can be removed from the overall structure for temporary storage, and then returned to the structure when their use is again required. This advantage makes the present invention very flexible and expandable to meet the user's needs.

Yet another advantage of the present invention is that it may be provided with a divider which can be snapped onto the unit's floor panel and slid laterally to provide lateral support for stored media.

Additionally, another advantage of the present invention is that the floor and back panels of the unit may be tilted backwards at approximately a 10 degree angle to provide further stability for the contained media during stationary use or transport.

A yet further advantage of the present invention is that although the units have varying heights to accommodate various media, they are designed with a common aesthetic scheme so that the overall structures assembled from the units are aesthetically pleasing.

Still another advantage of the present invention is that the units, when not in use, can be nested upon one another to save space. This allows for economy of transport, storage and display for sale, because less shelf space will be required for merchants and in warehouses.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

Note—The multimedia stacker rack is designed to include a version which may hold Compact Disks (CDs), which will be referred to as the "CD-sized version", and also a version which may hold VHS-sized video tapes, which will be referred to as the "VHS-sized version". The single units of the two versions may be stacked in any order to create an assemblage.

The purposes and advantages of the present invention will be apparent from the following detailed description in conjunction with the appended drawings in which.

BEST MODE FOR CARRYING OUT THE INVENTION

Figure 1:
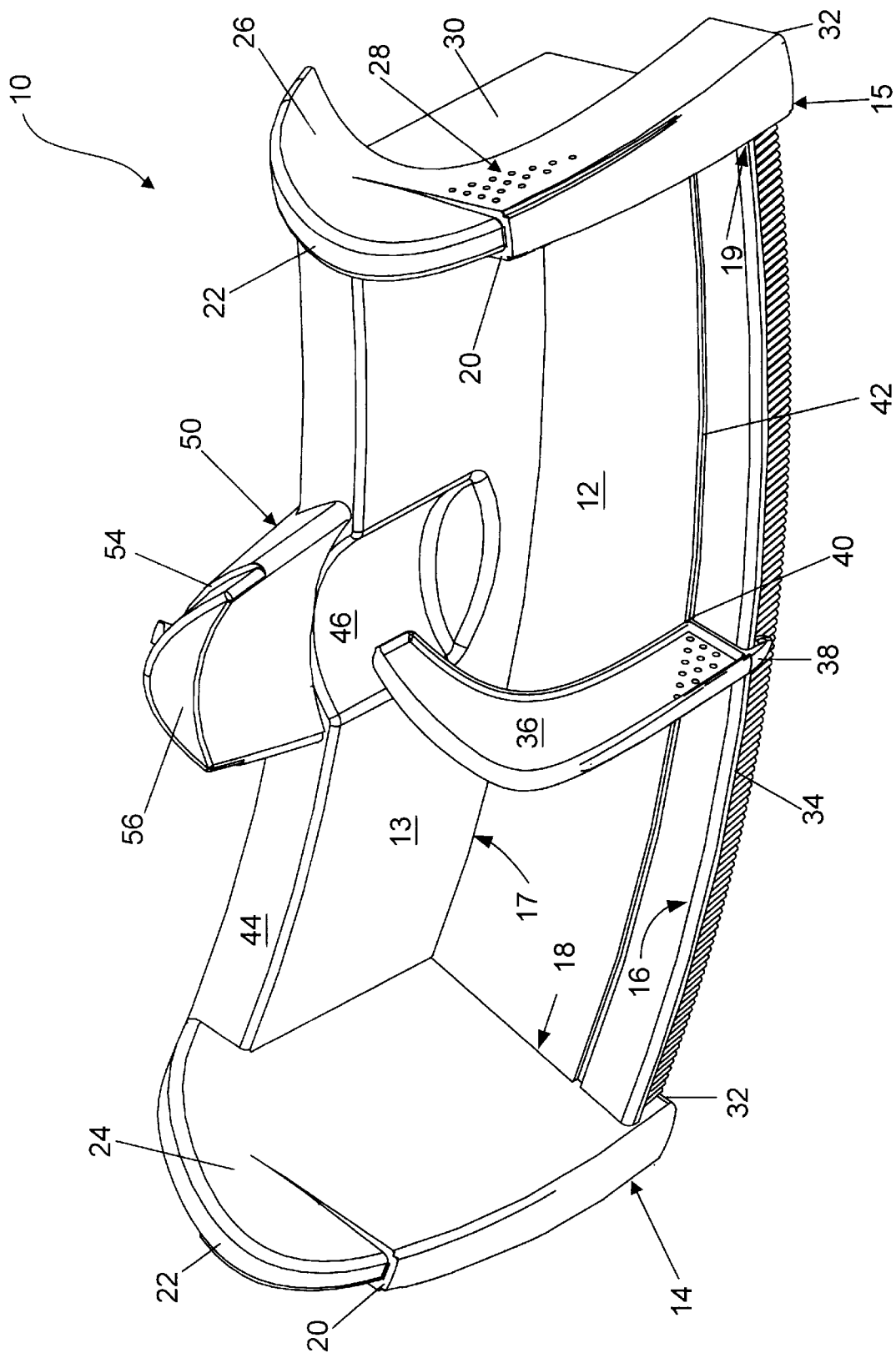
FIG. 1 is a front perspective view of a single CD-sized unit of the multimedia stacker rack.

The preferred embodiment of the present invention is a system of stackable racks for storing various media products. It is to be understood that the term "unit" shall be used to refer to a single detached rack, and the term "assemblage" shall be used to refer to multiple units which have been stacked together to form a larger structure. The individual units may come in sizes to accommodate storage of Compact Disks and these units are referred to as "CD-sized". A larger size can accommodate VHS-sized videocassettes, and these are referred to as "VHS-sized". It should be understood that many other variations in size are possible to hold such media as zip discs, laser discs, audiocassette tapes, video game cartridges and even books and magazines. The units are also not restricted to holding a single size or shape of media container, but may hold any combination of mixed sized media, which can be physically accommodated by the units' dimensions. Since both the CD-sized and VHS-sized units share in common all of the features to be discussed below, and differ only in height, a unit embodiment of either variety will be referred to generally in the drawings, and particularly in FIG. 1, by the general reference character 10.

FIG. 1 shows a basic unit 10, which may come in a variety of heights, but which may be standardized in width. The basic components of the unit 10 are a floor panel 12, a back wall 13, and left 14 and right 15 side panels. The floor panel 12 has a front edge 16, a rear edge 17, a left edge 18 and a right edge 19. The back wall 14 is attached to the floor panel's rear edge 17, the left side panel 14 is attached to the floor panel's left edge 18, and the right side panel 15 is attached to the floor panel's right edge 19.

Each side panel has a generally flat front contact shelf 20, below a panel arch 22, both of which aid in joining the unit 10 to another unit 10 which is stacked vertically upon it, as will be seen below. The panels additionally each have an inner arch wall 24, and the outer sides of the panels have curved cut-aways which serve as handles 26. A texture area 28 has been provided on each handle to aid in gripping the units. The side panels also each have an area designated as a side wall area 30. The bottom of each side panel terminates in a front foot 32.

Figure 4:
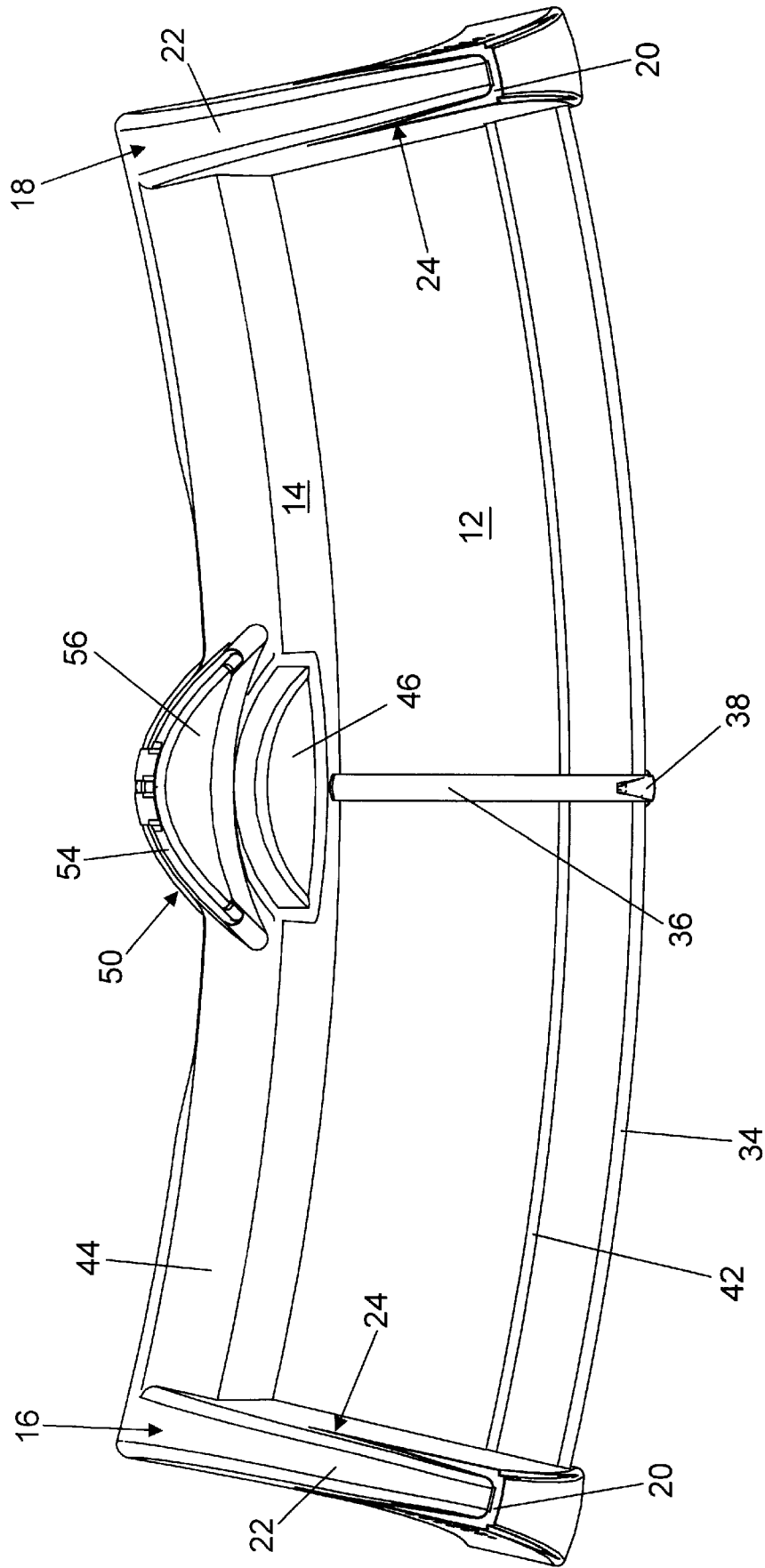
FIG. 4 is a top view of the unit of FIG. 1.

The floor panel 12 may be slightly curved to allow media items to be displayed in a slightly fan-shaped arrangement which facilitates viewing or removal of these items (see also FIG. 4). The floor panel 12 also has a front rim 34 attached to the floor panel's front edge 16, which adds stiffness and acts as an attachment mechanism for a slidable divider 36. The divider 36 has an outer snap retainer 38 which hooks around the front rim 34 of the floor panel 12. The divider 36 also has an inner snap retainer 40 which fits into the snap groove 42 of the floor panel 12 such that the divider 36 is held upright by the inner and outer snap retainers 40, 38, but is still free to slide laterally along the concentric arcs defined by the front rim 34 and the snap groove 42. This allows the divider 36 to be positioned to abut media products placed into the unit 10 to hold them upright, or the divider 36 may be removed if not required. The shape of the dividers 36 is subject to considerable design variation without affecting the spirit of the invention.

The back wall 13 is also slightly curved to match the concentric arc shape of the floor panel 12. Running the length of the back wall 13 and at right angles to it, is a rear rim 44 which adds structural support and stiffness to the unit 10. Near its mid-point, the rear rim 44 is interrupted by a shallow indent 46, and also by the junction with the vertebra 50, which will be discussed below. The indent 46 adds stiffness to the structure and also allows the units 10 to be nested, as discussed below.

The floor panel 12 and back wall 13 may meet at right angles to each other. Both the floor panel 12 and the back wall 13 may be tilted backwards slightly relative to a horizontal plane, perhaps 10 degrees, to allow better retention of media items during use or transport. The presence of an angular tilt or the degree of it may be subject to considerable design variation without affecting the spirit of the invention.

Figure 2:
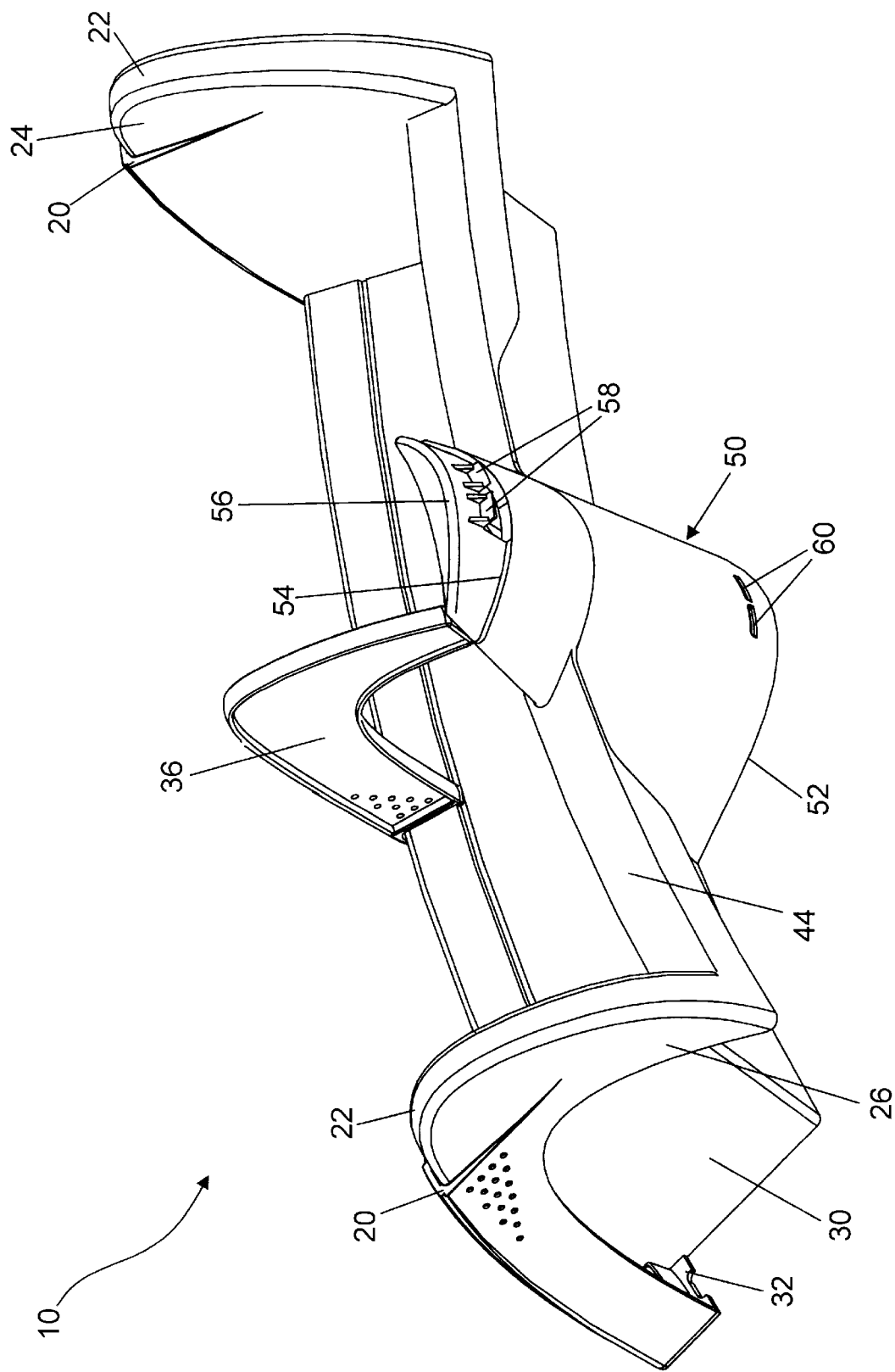
FIG. 2 is a rear perspective view of the unit of FIG. 1.

The vertebra 50 and its component parts can be partially seen in FIG. 1, but are better seen in FIG. 2, which is a rear view of a single unit 10. The vertebra 50 is roughly centered on the rear of the unit 10. Its lower portion terminates in a wide rear foot 52, which gives exceptional stability to the unit 10 and is used to join with other units in larger assemblages 100. The upper portion of the vertebra 50 has a rear contact shelf 54 and terminates in a contact fin 56.

To aid in stabilizing the overall structure, the units 10 of the various sizes are equipped with an optional retaining device. Although the units 10 are well designed to maintain their relation to each other when stacked, this retaining device helps hold the units 10 in proper alignment to each other. In this preferred embodiment, the retaining device is a pair of retaining tabs 58, which are located on the back of the contact fin 56, and a pair of corresponding retaining slots 60 on the back of the vertebra 50 near the rear foot 52. It should be understood that any one of a number of retaining devices, such as a single retaining tab, a ball and socket, latch, retaining pin and hole, etc. could be used as an aid to stability.

Figure 3:
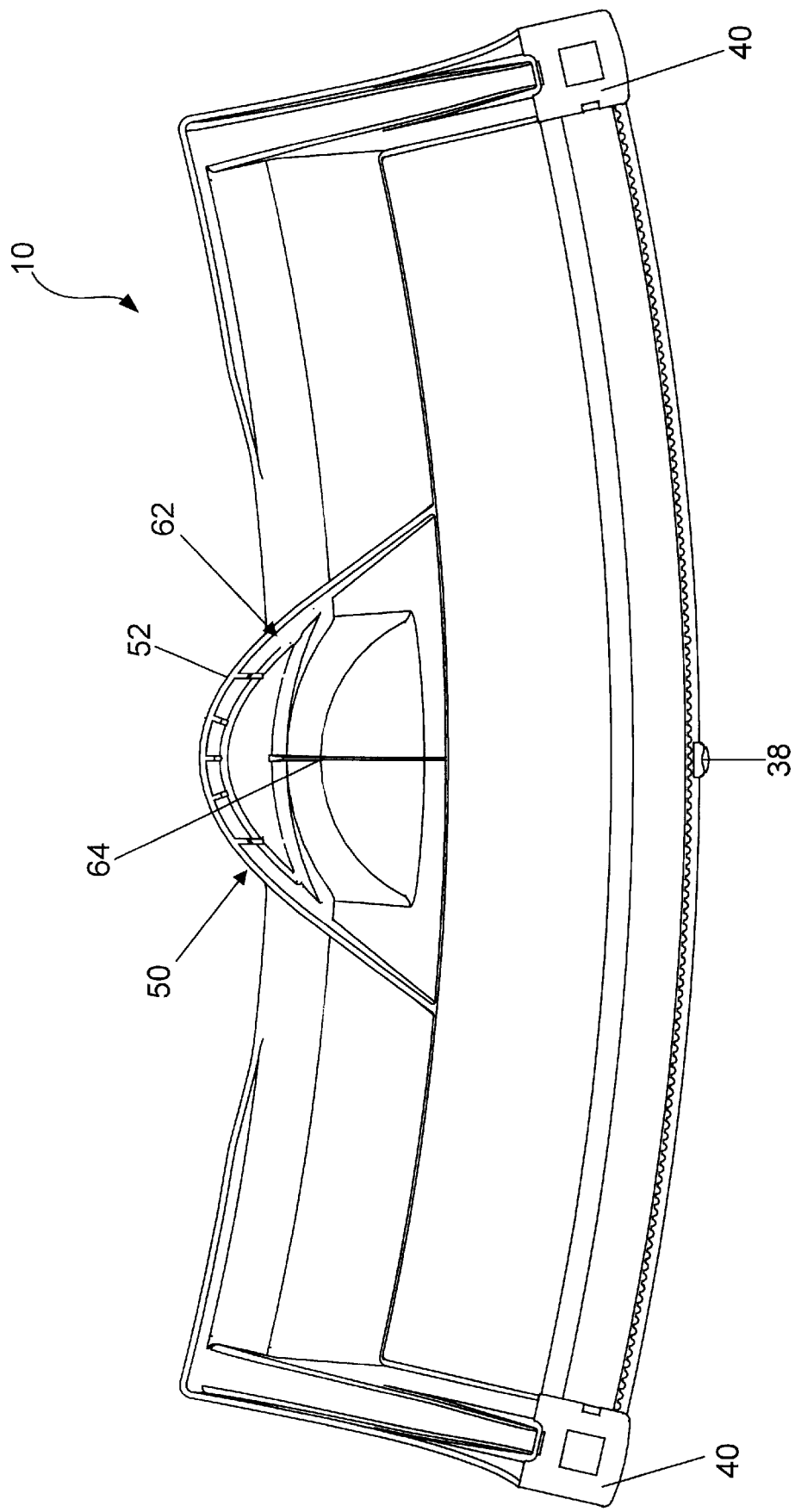
FIG. 3 is a bottom view of the unit of FIG. 1.

FIG. 3 is a bottom view of a single unit 10 which shows the front feet 32, the rear foot 52, and the interior of the vertebra 50. The vertebra cavity 62 is within the vertebra 50, and contains a reinforcing rib 64 which adds structural stiffness and serves to hold the contact fin 56 of a lower unit 10 in stable position when the units 10 are stacked.

FIG. 4 is a top view of a single unit 10 in which the concentric arcs defined by the front rim 34, the snap groove 42 and the back wall 14 can be more easily seen. The presence or degree of arc is subject to variation without affecting the spirit of the invention.

Figure 5:
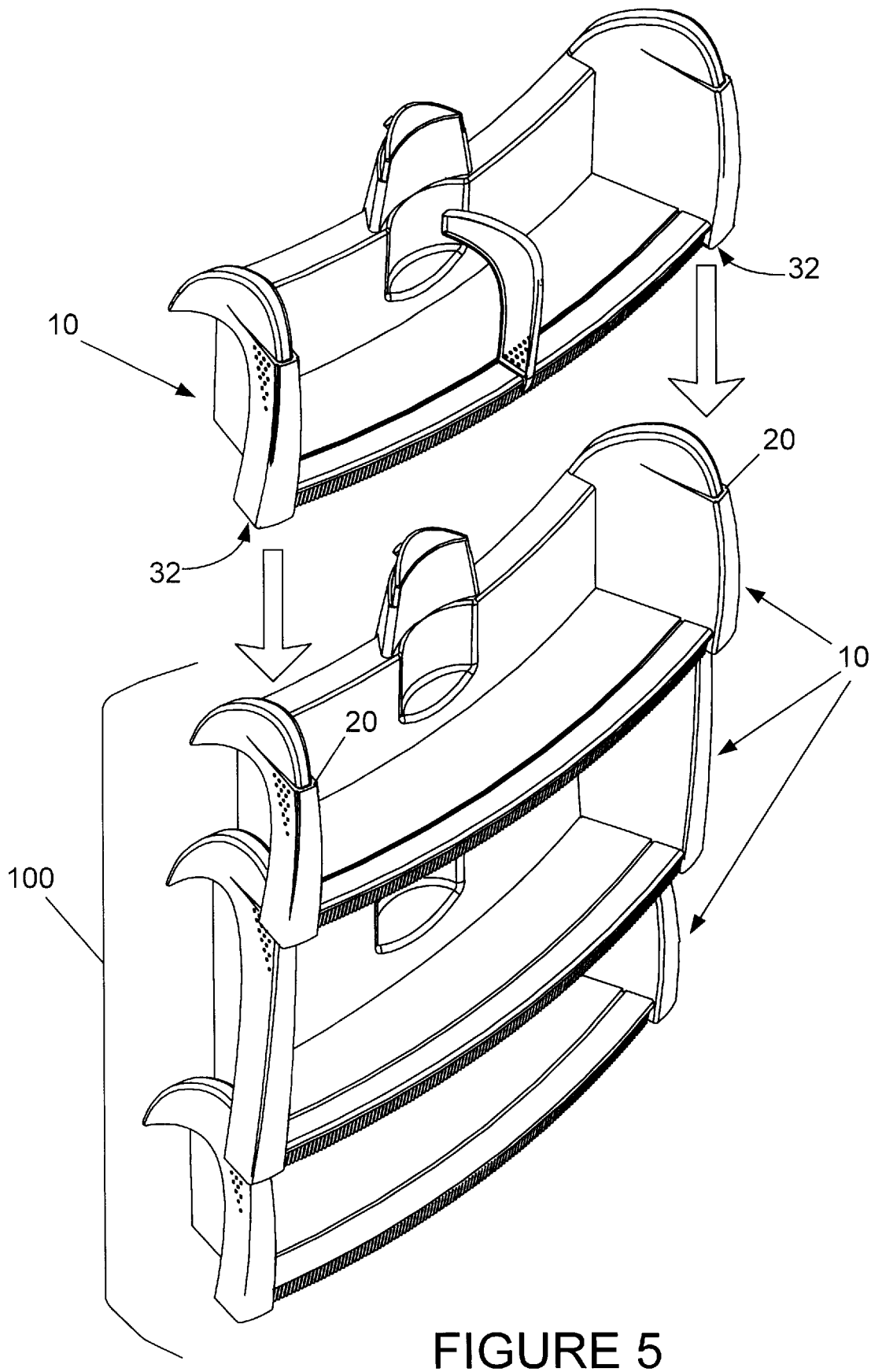
FIG. 5 is a front perspective view of a CD-sized first unit and a VHS-sized second unit mounted in stacked position with a CD-sized third on top to form an assemblage, and a CD-sized fourth unit in position to be stacked on the third unit with arrows indicating the contact points.
Figure 6:
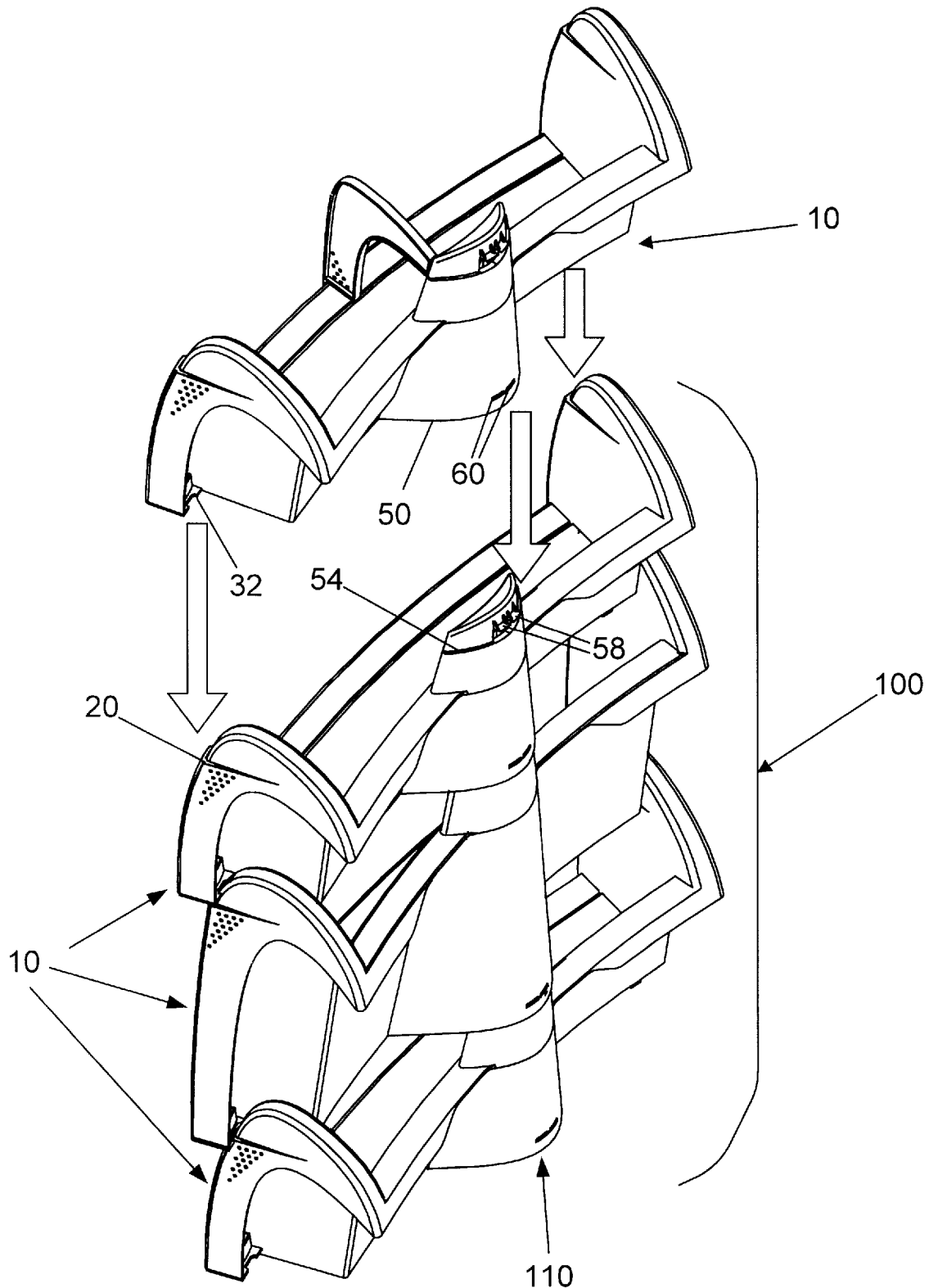
FIG. 6 is a rear perspective view of the assemblage and unit shown in FIG. 5.

FIG. 5 and FIG. 6 illustrate the manner in which the units stack together in a system to form an assemblage 100. In both figures, a CD-sized unit 10 has been stacked on a VHS-sized unit 10, which has in turn been stacked on another CD-sized unit 10, and a third CD-sized unit 10 is in position to be added to the top of the assemblage 100. It should be understood however that the units 10 are completely interchangeable in order of stacking. In FIG. 5, two units 10 have been stacked to form an assemblage of units 100. FIG. 6 is a rear view of the same assemblage 100 depicting the manner in which the vertebrae 50 of the units combine to form a spine 110. A unit 10 is stacked by aligning it vertically so that the contact fin 56 of the lower unit 10 is inserted into the vertebra cavity 62 (see FIG. 3) of the upper unit 10, and the front feet 32 of the upper unit 10 rest on the front contact shelves 20 of the lower unit 10 while the rear foot 52 rests on the rear contact shelf 54 of the lower unit 10. The inner arch walls 24 of the panel arches 22 of the lower unit 10 are positioned against the side wall areas 30 of the upper unit 10, giving the stack lateral stability. Likewise, the reinforcing rib 64 (see FIG. 3) of the upper unit 10 is positioned against the contact fin 56 of the lower unit 10 to give stability. During stacking, the retaining tabs 58 located on the contact fin are inserted into the retaining slots 60 from inside the vertebra cavity 62. It will be understood by those skilled in the art that considerable variation is possible in the means of attaching the units together without affecting the spirit of the invention.

The assemblages 100 and the component units 10 have been designed with the center of gravity such that the assemblages 100 are exceptionally stable even when unloaded, and this stability is enhanced further when media items are loaded in the units.

Figure 7:
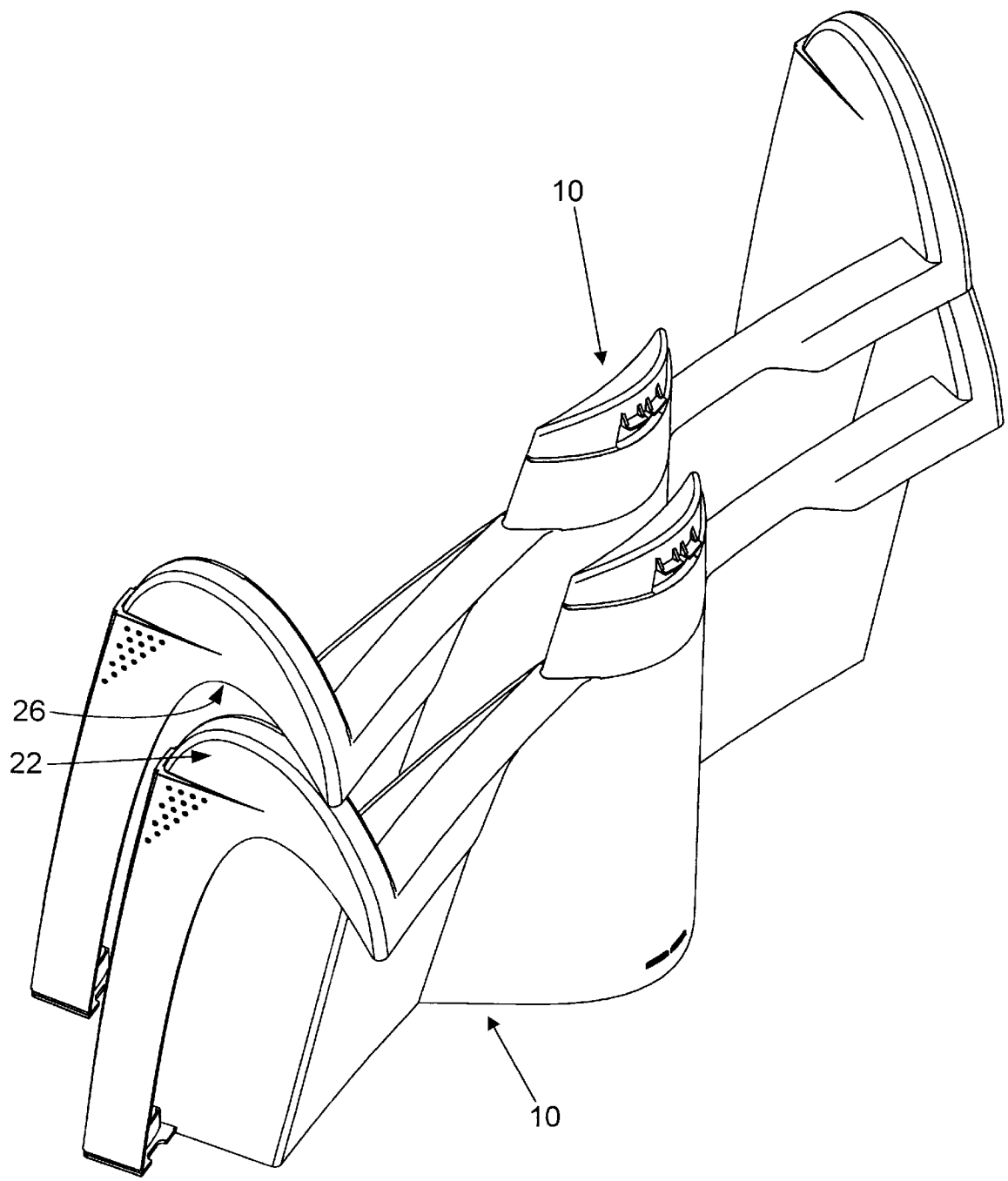
FIG. 7 is a rear perspective view of a VHS-sized first unit and a VHS-sized second unit mounted in nested position.

FIG. 7 shows two units 10, in this case two VHS-sized units 10, which have been nested for storage. The rear foot 52 of the vertebra of the upper unit 10 fits into the indent 46 in the back wall 14 of the lower unit 10 and the panel arches 22 of the lower unit 10 fit into the handle 26 cut away of the upper unit 10 to form a very compact grouping for storage, transport or display for sale. Although two units 10 are shown nested in FIG. 7, it should be understood that multiple units may be nested and boxed for shipment and sale in groups of 2, 3, 4 or more. This nesting capability can dramatically reduce the size of required packaging and consequently reduce the costs associated with shipping, storing and displaying these items.

Various modifications and alterations of the multimedia storage rack may be made without departing from the spirit of the invention. Accordingly, the above disclosure is not to be considered as limiting.

INDUSTRIAL APPLICABILITY

The present multimedia stacker racks 10 are well suited for storage of media of many sorts, including disk media such as compact disks, digital versatile disks, zip cartridges, audio and video tapes, video game cartridges and print media. The racks 10 are available in a variety of sizes to accommodate various types of media, and they all have the same "footprint" or projection onto a horizontal plane. Thus, they connect together easily in any combination to form structures 100 which conserve room and floor space.

The individual units 10 each have two front feet 32 and a broad rear foot 52 which align with front and rear contact shelves 20, 54 on a lower unit 10. Additionally, each unit 10 has a rear vertebra 50, all of which align to form a spine 110 for stability. The units 10 also have a retaining tab mechanism 58, 60 to help maintain proper connection between units 10 in the overall assemblage 100. The floor panel 12 of each unit 10 is tilted backwards slightly to help in retaining the media in the racks. The units 10 are designed so that when loaded with media, the center of gravity is well positioned for the overall stability of the structure. All of these features help to provide a storage system which is very stable even when in a freestanding position, rather than backed against a wall, as are most conventional bookcases. Therefore, they may be utilized in many locations where less stable structures would be unsuitable.

Some kinds of media may be fairly heavy and cumbersome to manipulate when aggregated. To help with this problem, each unit 10 is also provided with carrying handles 26 for easily transporting the units 10 and their contents. The handles 26 are well integrated with the curved arches 22 of the side panels 14, 15, and they contribute aesthetically to the overall appearance. Each of the handles 26 also includes a textured area 28 that aids in secure handling.

The units 10 are also equipped with a sliding divider 36, which can help to support media which are stacked edgewise in the racks, on the occasions where the rack is only partially full. This divider 36 slides to accommodate any width of collected media, and is easily removable when not required.

Additionally, the floors 12 of the units 10 are designed to have front 16 and rear edges 17 which are concentrically arced. This allows the stored media to be slightly fanned out from the rear to the front edge. This makes selection and removal of a desired media item easier, and allows for easier browsing of the contents.

The units 10 are designed to nest together in a compact configuration. This is an important consideration when multiples of the units are boxed for shipment and sale. The nested units takes less space when shipped, warehoused, and stored or displayed for sale in stores. This feature can mean significant savings for manufacturers and merchants.

All portions of the embodiments presented herein can be made of inexpensive materials using quite conventional methods of manufacture. The inventors anticipate that plastic will be the main material of fabrication. Conventional molding techniques, with some minor assembly, are adequate for constructing the units of the present invention.

For all of the above reasons, when compared to prior storage devices, the present invention presents many advantages which will be appreciated by the consumer, as well as by the manufacturer and the merchant. Therefore it is expected that the multimedia storage rack of the present invention will have widespread industrial applicability. It is expected that the commercial utility of the present invention will be extensive and long lasting.

What is claimed is:

1. A storage container for storing, transporting and displaying various information and entertainment storage media the container comprising:
    a floor panel having a front edge and a rear edge, and right and left edges;
    a back wall which attaches to the rear edge of said floor panel;
    left and right side panels, which are attached to the left and right edges respectively of said floor panel, each said side panel having a lower portion which terminates in a front foot; and
    said back wall including a vertebra, said vertebra having a lower portion which terminates in a rear foot.

2. The storage container of claim 1 wherein:
    said front and rear edges of said floor panel are sections of concentric arcs where said front edge is of larger arc radius than the arc radius of the rear edge, so that displayed media, when stored in said storage containers as to stand vertically, are held in a fanned-out configuration.

3. The storage container of claim 1 wherein:
    said left and right side panels each include a handle portion.

4. The storage container of claim 3 wherein:
    said handle portions include a texture area, to aid in gripping when handled.

5. The storage container of claim 1 wherein:
    said container includes a divider which slidably engages said floor panel, said slider being positionable intermediate said side panels to support stored items in an upright position.

6. The storage container of claim 1 wherein:
    said floor panel is tilted, such that said floor panel front edge is higher than said floor panel rear edge relative to a horizontal plane.

7. The storage container of claim 1 wherein:
    said back wall of the container is contoured with an indent to accommodate the vertebra portion of a second instance of the container, for nesting together for storage or transporting.

8. A system of stackable storage containers for storing, transporting and displaying various information and entertainment storage media the container comprising:
    a floor panel having a front edge and a rear edge, and right and left edges;
    a back wall which attaches to the rear edge of said floor panel;
    left and right side panels, which are attached to the left and right edges respectively of said floor panel, each said side panel having a lower portion which terminates in a front foot;
    said back wall including a vertebra, said vertebra having a lower portion which terminates in a rear foot;
    said front and rear feet, said side panel contact shelves, said vertebra contact shelves, and said vertebra of said storage containers are aligned such that when an upper storage container is stacked vertically upon a lower storage container, said front feet of the upper storage container rest upon said side panel contact shelves of the lower storage container, and said rear foot of the upper storage container rests on said vertebra contact shelf of the lower storage container, and said vertebrae of the upper and lower storage containers align to form a spine.

9. The system of storage containers of claim 8 wherein:
    said vertebrae include retaining means for attaching a lower storage container to an upper storage container, to provide stability to the overall structure.

10. The system of storage containers of claim 9 wherein:
    said retaining means includes at least one retaining tab on the upper portion of the vertebra of said lower storage container which engages at least one retaining slot in the lower portion of said upper storage container.

11. The system of storage containers of claim 8 wherein:
    said front and rear edges of said floor panel are sections of concentric arcs with said front edge of larger arc radius than the rear edge, so that displayed media when stored as to stand vertically, are held in a fanned out configuration.

12. The system of storage containers of claim 8 wherein:
   said left and right side panels each include a handle portion.
13. The system of storage containers of claim 12 wherein:
   said handle portions include a texture area, to aid in gripping when handled.
14. The system of storage containers of claim 8 wherein:
   each said container includes a divider which slidably engages said floor panel, said slider being positionable intermediate said side panels to support stored items in an upright position.
15. The system of storage containers of claim 8 wherein:
   said floor panels are tilted, such that each said floor panel front edge is higher than said floor panel rear edge relative to a horizontal plane.
16. The system of storage containers of claim 8 wherein:
   said back wall is contoured with an indent to accommodate the vertebra of said second container which is nested with said first container for storage or transporting.

* * * * *

UNITED STATES PATENT AND TRADEMARK OFFICE
CERTIFICATE OF CORRECTION

PATENT NO. : 5,848,709
DATED : December 15, 1998
INVENTOR(S) : Steven A. Gelphman, et al.

It is certified that error appears in the above-identified patent and that said Letters Patent is hereby corrected as shown below:

Col. 1, line 20, replace "modem" with --modern--.

Col. 1, line 64, after "a" add --location--.

Col. 2, line 28, after "stackable." add --It-- which begin a new paragraph.

Signed and Sealed this

Eleventh Day of May, 1999

Attest:

Q. TODD DICKINSON

Attesting Officer

Acting Commissioner of Patents and Trademarks